United States Patent [19]

Templeman

[11] 4,436,445
[45] Mar. 13, 1984

[54] STUD ANCHOR FOR SECURING A HOLLOW NON-ROUND EXTENSION BASE

[75] Inventor: Arthur R. Templeman, Overland Park, Kans.

[73] Assignee: Peterson Manufacturing Co., Grandview, Mo.

[21] Appl. No.: 317,888

[22] Filed: Nov. 3, 1981

[51] Int. Cl.³ .......................... F16B 7/08; F16L 41/00
[52] U.S. Cl. ...................................... 403/189; 411/50; 403/259
[58] Field of Search .................. 411/49, 50, 51, 55; 403/189, 192, 193, 249, 250, 259, 260, 264; 248/251; 211/182

[56] References Cited

U.S. PATENT DOCUMENTS

| 880,415 | 2/1908 | Stevens . | |
|---|---|---|---|
| 1,463,824 | 8/1923 | Leuvelink | 403/264 X |
| 2,465,751 | 3/1949 | Robins . | |
| 2,687,547 | 8/1954 | Matter | 403/297 X |
| 2,895,380 | 7/1959 | Kurlytis . | |
| 2,904,379 | 9/1959 | Nelson | 403/297 X |
| 2,984,249 | 5/1961 | Sears, Jr. et al. . | |
| 3,235,294 | 2/1966 | Naylor et al. . | |
| 3,498,579 | 3/1970 | Vicary . | |
| 3,712,715 | 1/1973 | Wagner . | |
| 4,013,372 | 6/1975 | Lay et al. | 403/297 X |
| 4,162,133 | 7/1979 | Clark et al. | 411/50 X |
| 4,190,375 | 2/1980 | Berry | 403/260 X |

Primary Examiner—Wayne L. Shedd
Attorney, Agent, or Firm—Litman, Day & McMahon

[57] ABSTRACT

A stud anchor is provided for securing to an associated mounting bracket a non-round hollow extension having planar inner wall surfaces which are parallel to a longitudinal axis of the extension. The stud anchor comprises an expandable anchor member having a shank portion and a head with the head comprising a plurality of resiliently deformable segments. The segments each include an outer surface which is biased into frictional contact with an associated inner wall surface of the extension securing the extension to the stud anchor.

8 Claims, 5 Drawing Figures

STUD ANCHOR FOR SECURING A HOLLOW NON-ROUND EXTENSION BASE

BACKGROUND OF THE INVENTION

This invention relates to anchors for securing vehicular mirror extensions to an associated mounting bracket and in particular to a stud anchor for securing a hollow extension to such a mounting bracket.

In many vehicular applications wherein that which is being pulled by the vehicle is extremely wide such as in recreational vehicles, campers or the like, it is necessary that outside rearview mirrors be mounted on extensions to place the mirrors a significant distance outwardly from the vehicle body in order for a driver of a vehicle to receive an adequate reflection of the road behind him through the rearview mirror.

Prior art examples of rear view mirror extension assemblies have generally been cumbersome and difficult to assemble requiring a plurality of associated fasteners.

SUMMARY OF THE INVENTION

A stud anchor is provided for securing a hollow extension upon which is attached a vehicular mirror to an associated mounting bracket for attachment to an associated vehicle. The hollow extension includes an inner cavity bounded by planar inner wall surfaces which are substantially parallel to a longitudinal axis of the extension. The stud anchor comprises an expandable anchor member which includes a shank and a head portion with the head portion having a plurality of laterally spaced resiliently deformable segments attached to the shank. The segments are adapted to be biased outwardly from a longitudinal axis of the anchor member. The deformable segments include outer wall surfaces which are frictionally engageable with the inner wall surfaces of the hollow extension when the hollow extension is placed over the expandable anchor member. Further, the expandable segments each include on a radially inward portion thereof, an axially and radially outwardly expanding face. Biasing means are provided to bias the anchor member segments radially outwardly into frictional contact with the hollow extension inner wall surfaces and to attach the expandable anchor member to the mounting bracket. The biasing means comprises a draw bolt which is received within an anchor member axial bore and which extends through an aperture in the mounting bracket. The draw bolt includes a head portion having a skirt which engages the inner portion faces of the anchor member head segments and which, when the draw bolt is pulled through the anchor member and mounting bracket, biases the segments outwardly into frictional contact with the inner walls of the extension, securely retaining the extension to the mounting bracket.

OBJECTS OF THE INVENTION

Therefore the objects of the present invention are: to provide a stud anchor for securing a hollow extension having parallel opposed inner walls to an associated mounting bracket; to provide such a stud anchor which includes an expandable anchor member having a shank and a head portion; to provide such a stud anchor wherein the head portion includes a plurality of laterally spaced resiliently deformable segments, each having an outer surface engageable with an associated inner wall surface of the hollow extension; to provide for such a stud anchor a biasing means to bias the anchor member deformable segments radially outwardly into frictional contact with the hollow extension; to further provide, for such a stud anchor, means to retain the stud anchor and hollow extension onto the associated mounting bracket; to provide, for such a stud anchor, a draw bolt which both biases the segments outwardly into frictional contact with the extension inner walls and securely retains the stud anchor to the associated mounting bracket; and to further provide such a stud anchor which is easily used, inexpensive to manufacture, capable of securely retaining a hollow extension to an associated mounting bracket and which is particularly well adapted for the intended usage thereof.

Other objects and advantages of this invention will become apparent from the following description taken in conjunction with the accompanying drawings wherein are set forth, by way of illustration and example, certain embodiments of this invention.

The drawings constitute a part of this specification and include exemplary embodiments of the present invention and illustrate various objects and features thereof.

DETAILED DESCRIPTION OF THE PREFERRED EMBODIMENT

As required, detailed embodiments of the present invention are disclosed herein, however, it is to be understood that the disclosed embodiments are merely exemplary of the invention which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure.

Figure 1:
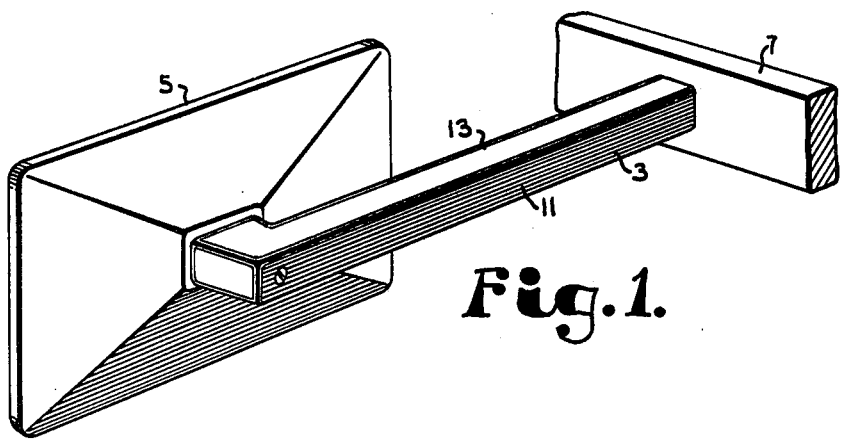
FIG. 1 is a fragmentary perspective view showing a hollow non-rounded extension attaching a vehicular mirror to an associated mounting bracket.
Figure 2:
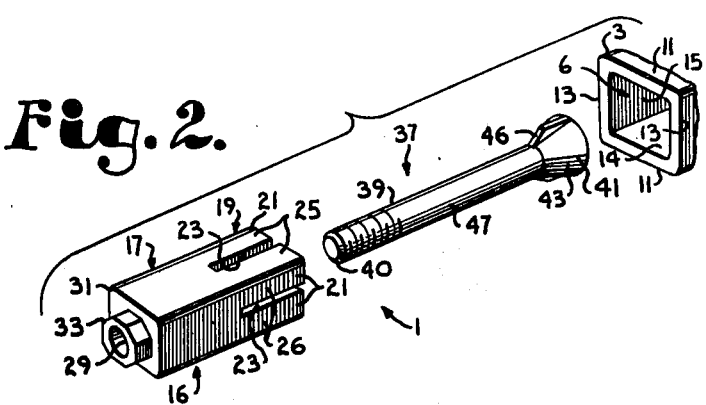
FIG. 2 is an exploded perspective view of a stud anchor assembly according to the present invention.
Figure 3:
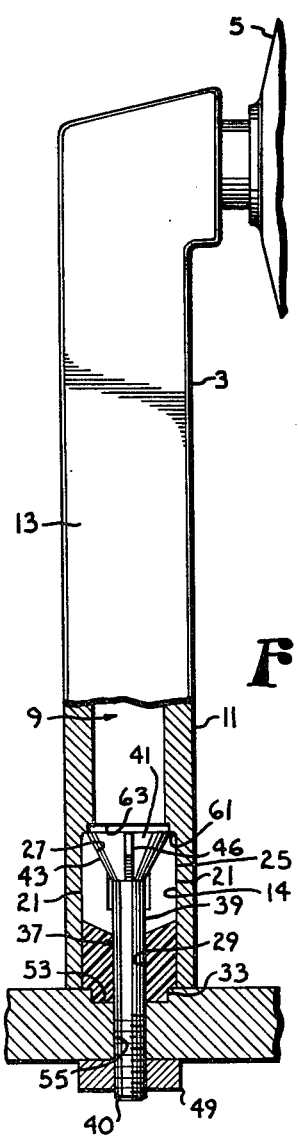
FIG. 3 is a side elevational view of a hollow extension, mounting bracket and stud anchor, with portions broken away to show details thereof.
Figure 4:
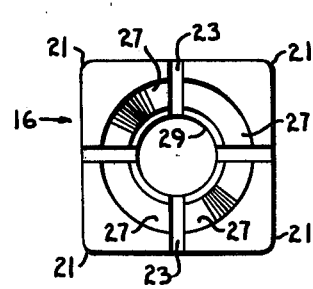
FIG. 4 is an enlarged cross-sectional view taken generally along line 4—4 in FIG. 3.

The reference numeral 1 generally designates a stud anchor according to the present invention. As shown in FIGS. 1 and 3, the stud anchor 1 is used to secure a hollow extension 3, having a mirror unit 5 retained thereon, to an associated mounting bracket 7. The mounting bracket 7 is securely attached to an associated vehicle (not shown). It is foreseen that, although the stud anchor 1 is shown herein used in conjunction with attaching a hollow mirror extension 3 and an associated mounting bracket 7, the stud anchor 1 could be used to secure any number of hollow members to an associated support member.

Preferably, the hollow extension 3 is non-round and, as shown herein, in FIG. 3, the hollow extension 3 has a square cross-section and includes an inner cavity 9 bounded by planar side walls 11 and 13 which are generally parallel to a longitudinal axis of the extension 3.

The side walls 11 and 13 each exhibit an inner wall surface 14 and 15 respectively. It is noted that the extension side walls 11 and 13 could exhibit a slight outward divergence in a lower portion 4 of the extension 3 near an opening 6 therein. This would be to aid facilitating placement of the extension 3 over the stud anchor 1. Further, the hollow extension 3 could have a cross-sectional non-round shape of other than a square and still conform to the present invention.

Figure 5:
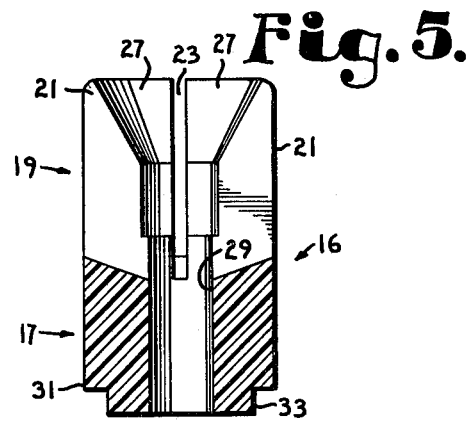
FIG. 5 is a cross-sectional view of the stud anchor taken generally along line 5—5 in FIG. 2.

The stud anchor 1 includes an expandable anchor member 16 having a shank 17 and a head 19. The anchor member head 19 comprises a plurality of segments 21 laterally spaced apart by relief grooves 23. The segments 21 are resiliently deformable such as to allow outward pivoting with respect to the shank 17. The head segments 21 each include planar outer wall surfaces 25 and 26. It is seen that the collective opposed surfaces 25 and 26 are generally parallel to an axis of the anchor member. As shown in FIG. 5, the head segments 21 further include an inner face 27 which is beveled axially and radially outwardly from an inner passageway 29 through the anchor member 16. The collective head segment inner faces 27 form an inner surface of a frustum and as shown herein the collective segment faces 27 form an inner surface which is frusto-conical in shape.

The anchor member shank 17 includes extending out of an end surface 31 thereof a base 33. As shown herein, the base 33 is octagonal in shape.

The stud anchor 1 further includes a draw bolt 37 which is received in the anchor member passageway 29. The draw bolt 37 includes a shank portion 39 having a distal end 40 and a head portion 41. The head portion 41 includes a skirt 43 extending between an end face 45 of the head and a shank outer surface 47 and having keys 46 extending outwardly therefrom. The skirt 43 generally forms an outer surface of a frustum and, as shown herein, forms an outer surface which is generally frusto-conical in shape. The draw bolt shank 39 is threaded so as to receive a suitable retaining nut 49 thereon at the distal end 40 thereof.

As shown in FIG. 3, the mounting bracket 7 includes an octagonal indentation 53 in which is received the anchor member shank base 33 and an aperture 55 which is coaxial with the anchor member passageway 29 when the anchor member 16 is placed thereon.

The extension 3 is manufactured of a suitable non-deformable material such as a mild steel and the expandable anchor member 16 can be manufactured of a resiliently deformable material such as thirty percent (30%) glass-filled nylon.

In use, the stud anchor 1 is used to retain a hollow extension 3 to a suitable mounting bracket 7. In doing so, the anchor member 16 is placed in operative position relative to the mounting bracket such that the anchor member base 33 is received in the mounting bracket octagonal indentation 53. When the anchor member 16 is in such a position the draw bolt 37 is received in the draw bolt passageway 29 with the draw bolt distal end 40 extending through the mounting bracket aperture 55. The draw bolt keys 46 are received in the anchor member head relief grooves 23 to prevent the draw bolt 37 from turning with respect to the anchor member 16 when the retained nut 49 is threaded thereon. As the retaining nut 49 is threaded thereon, the draw bolt 37 is pulled through the passageway 29 to an extent where the draw bolt skirt 43 begins to contact the anchor member head segment inner faces 27. When the draw bolt is in such a position, the anchor member 16 is securely retained to the mounting bracket 7. At this time the hollow extension 30 is positioned over the anchor member 16 as shown in FIG. 3. Preferably, an outer end surface 57 of the hollow extension 3 contacts an outer surface 59 of the mounting bracket 7. It is noted that the extension inner side walls 11 and 13 exhibit a first and second shoulder 61 and 63 repectively. Shoulder 61 prohibits the stud anchor 16 from falling into the extension cavity 9 if retaining nut 49 is removed from draw bolt 37. Further, the second shoulder 63 prevents the draw bolt 37 from falling through the stud anchor into the extension cavity 9 when the nut 49 is removed therefrom.

When the hollow extension 3 is in position over the anchor member 16, the draw bolt 37 is drawn through the anchor member passageway 29 by tightening the retaining nut 49 on the draw bolt shank 39. When this occurs, the draw bolt head skirt 43 engages the anchor member head segment inner face 27 biasing the head segments 21 outwardly such that the anchor member head segment outer wall surfaces 25 and 26 are biased into frictional contact with the extension inner wall surfaces 14 and 15 respectively. As the retaining nut 49 is tightened further on draw bolt 37, the frictional contact between a mating surface increases to an extent that the hollow extension 3 is securely attached to the stud anchor 1.

It is seen that it is only the frictional contact between the mating surfaces of the segments 21 and the extension 3 which provides the force to retain the extension 3 onto the stud anchor 1 and therefore the mounting bracket 7. It is further seen that since the inner wall surfaces 14 and 15 of the extension 3 are either parallel or diverge slightly outwardly near the lower portion opening 6 thereof that there is no lip or the like to provide any additional forces to retain the extension 3 onto the stud anchor 1.

It is to be understood that while certain embodiments of the present invention have been illustrated and described herein, it is not to be limited to the specific forms or arrangement of parts described and shown.

What is claimed and desired to secure by Letters Patent is:

1. A stud anchor in an operational combination with a hollow extension and a mounting bracket, wherein said stud anchor firmly connects said hollow extension to said mounting bracket;
  (a) said stud anchor comprising an anchor member having a base, a shank, and a head; a biasing member; and anchor member securing means;
    (1) said base being on an end of said anchor member abutting said mounting bracket; said base having a locking means comprising a non-round lug depending from said base and adapted to snugly mate with an aperture in said mounting bracket, thereby preventing free rotation of said anchor member relative to said mounting bracket and ensuring proper orientation of said stud anchor relative to said mounting bracket;
    (2) said shank being an extension between said base and said head of said anchor member;
    (3) said head including a plurality of resiliently deformable segments flexibly attached to said shank, said segments each having an outer wall surface;
    (4) said biasing member having selective activation means adapted for selective biasing of said segments outwardly from an axis of said anchor member and into frictional engagement with said hollow extension;
(5) said anchor member securing means adapted for selective, secure attachment of said anchor member to said mounting bracket;
(b) said hollow extension having inner wall surfaces snugly enclosing said stud anchor; said stud anchor is operably positioned in the extension and with an end of said hollow extension being of configuration requiring fixed and predetermined orientation relative to said mounting bracket; said non-round lug on said anchor member controlling and fixing said orientation;
(c) whereby when said segments are selectively biased outwardly by said biasing member into frictional engagement with said hollow extension inner wall surfaces, said stud anchor securely retains said extension onto said mounting bracket.

2. An assembly including a hollow extension, a mounting bracket and a stud anchor for selectively securing said hollow extension to said mounting bracket;
(a) said stud anchor including an anchor member having a base, a shank, and a head;
(1) said base having a locking means comprising a member fixedly engaging with a portion of said mounting bracket and preventing free rotation of said anchor member relative to said mounting bracket when assembled;
(2) said shank being an extension between said base and said head of said anchor member;
(3) said head including a plurality of resiliently deformable segments flexibly attached to said shank, said segments each having an outer wall surface;
(b) said stud anchor including a biasing member having selective activation means, said activation means adapted for selective biasing of said segments outwardly from an axis of said anchor member;
(c) said stud anchor including an anchor member securing means adapted for selective, secure attachment of said anchor member of said stud anchor to said mounting bracket;
(d) said stud anchor being connected to said mounting bracket by said anchor member securing means;
(e) said hollow extension snugly enclosing said stud anchor with an end of said hollow extension abutting said mounting bracket; said hollow extension having an operational orientation associated therewith relative to said bracket; said locking means providing perpendicular rotational orientation of said hollow extension relative to said mounting bracket;
(f) said biasing member being selectively activated by said biasing member activation means, thereby biasing said segments toward and in frictional engagement with said hollow extension inner wall surfaces and establishing a frictional engagement between said anchor member and said hollow extension securing said hollow extension to said stud anchor.

3. The assembly according to claim 2 wherein:
(a) said locking means is a non-round lug extending from said anchor member and snugly mating with a similarly shaped aperture in said mounting bracket when said stud anchor is attached to said mounting bracket, thereby preventing rotation of said stud anchor relative to said mounting bracket during assembly.

4. The assembly according to claim 3 wherein:
(a) said biasing member is a draw bolt including a bolt head, a threaded shank and a key; said bolt shank extending through an anchor member passageway and a mounting bracket aperture when said stud anchor is assembled for use, said key adapted for engaging a portion of said anchor member and preventing free rotation of said draw bolt relative to said anchor member; said draw bolt heat including a skirt thereon and being of configuration permitting engagement with head segment inner faces;
(b) said biasing member activation means is a retaining nut threadably received on a draw bolt shank distal end, when said stud anchor is assembled with said bolt shank extending through said anchor member passageway and an aperture in said mounting bracket, whereby when said retaining nut is tightened on said draw bolt shank said stud anchor is attached to said mounting bracket and as said retaining nut is further tightened on said draw bolt shank said draw bolt is pulled through said anchor member passageway and said mounting bracket aperture biasing said skirt into contact with said segment inner faces deforming said segments radially outwardly into frictional contact with inner wall surfaces of said hollow extension encompassing said anchor member and abutting said mounting bracket thereby firmly connecting said hollow extension to said mounting bracket.

5. The assembly according to claim 4 wherein:
(a) said draw bolt skirt is substantially frusto-conical in shape; and
(b) said head segment inner faces each have a configuration beveled axially and radially outwardly of said passageway, collectively said segment inner faces defining a volume which is substantially frusto-conical in shape.

6. The assembly according to claim 5, wherein:
(a) said anchor member shank is of a substantial length spacing said anchor member head away from said anchor member base, whereby when said hollow extension is fit over said anchor member and biasing occurs said head deformable segments engage said hollow extension in substantially spaced relation from the end of said hollow extension.

7. An assembly comprising a bracket, a hollow extension and an anchor member:
(a) said anchor member having a shank, a head and a base; said anchor member having an axial passageway therethrough and having a generally rectangular cross section in a plane perpendicular to said axial passageway;
(1) said base having locking means including a lug member fixedly engaging said mounting bracket and preventing free rotation of said anchor member relative to said mounting bracket when in an operational configuration thereof;
(2) said head including a plurality of resiliently deformable segments flexibly attached to said shank, said segments having planar outer surfaces substantially parallel to said axial passageway of said anchor member and being adapted for biasing away from a longitudinal axis of said passageway, said segments each including an inner face having a configuration beveled axially and radially outwardly of said passageway, collectively said segment inner faces defining a volume which is substantially frusto-conical in shape; said segment planar outer surfaces adapted to mate with associated inner wall surfaces of said hollow extension;

(b) a draw bolt including a bolt head, a threaded shank and a key; said bolt shank extending through said anchor member passageway and a mounting bracket aperture when said stud anchor is assembled for use, said key adapted for engaging a portion of said anchor member and preventing free rotation of said draw bolt relative to said anchor member; said draw bolt head including a skirt thereon and being of configuration permitting engagement with said segment inner faces, said skirt being substantially frusto-conical in shape; and (c) a retaining nut threadably received on said draw bolt shank distal end, when said stud anchor is assembled with said bolt shank extending through said anchor member passageway and an aperture in said mounting bracket, whereby when said retaining nut is tightened on said draw bolt shank said stud anchor is attached to the mounting bracket and as said retaining nut is further tightened on said draw bolt shank said draw bolt is pulled through said anchor member passageway and the mounting bracket aperture biasing said skirt into contact with said segment inner faces deforming said segments radially outwardly into frictional contact with inner wall surfaces of said hollow extension encompassing said anchor member and abutting said mounting bracket thereby firmly connecting said hollow extension to said mounting bracket.

8. An assembly including a hollow extension, a mounting bracket and a stud anchor for selectively securing said hollow extension to said mounting bracket;

(a) said stud anchor including an anchor member having a base, a shank, and a head; said head including a plurality of resiliently deformable segments flexibly attached to said shank, said segments each having an outer wall surface;

(b) said stud anchor including a biasing member having selective activation means, said activation means adapted for selective biasing of said segments outwardly from an axis of said anchor member;

(c) said stud anchor including an anchor member securing means connecting said mounting bracket to said anchor member;

(d) said hollow extension snugly enclosing said stud anchor with an end of said hollow extension abutting said mounting bracket when in operational orientation thereof;

(e) said biasing member being selectively activated by said biasing member activation means, thereby biasing said segments toward and into frictional engagement with inner wall surfaces of said hollow extension and establishing a frictional engagement between said anchor member and said hollow extension securing said hollow extension to said stud anchor;

(g) said anchor member shank being an extension between said base and said head of said anchor member, said anchor member shank being of a substantial length and spacing said anchor member head substantially away from said anchor member base, whereby, when said said hollow extension is fit over said anchor member and biasing occurs, said head deformable segments engage said hollow extension in substantially spaced relation from the end of said hollow extension.

* * * * *